(12) United States Patent
Park et al.

(10) Patent No.: US 8,581,866 B2
(45) Date of Patent: *Nov. 12, 2013

(54) USER INPUT DEVICE AND ELECTRONIC APPARATUS INCLUDING THE SAME

(75) Inventors: Sung-Hyuk Park, Yongin-si (KR); Seong-Taek Lim, Suwon-si (KR); Gi-Tae Mun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

This patent is subject to a terminal disclaimer.

(21) Appl. No.: 13/103,221

(22) Filed: May 9, 2011

(65) Prior Publication Data

US 2011/0279374 A1   Nov. 17, 2011

(30) Foreign Application Priority Data

May 11, 2010   (KR) .................. 10-2010-0044031

(51) Int. Cl.
*G06F 3/0488*   (2013.01)
(52) U.S. Cl.
USPC .......................................................... 345/173
(58) Field of Classification Search
USPC ............................ 340/407.1–2; 434/112–117
See application file for complete search history.

(56) References Cited

U.S. PATENT DOCUMENTS

| | | | |
|---|---|---|---|
| 5,055,840 A | 10/1991 | Bartlett | |
| 5,222,895 A | 6/1993 | Fricke | |
| 5,977,867 A | 11/1999 | Blouin | |
| 6,118,435 A | 9/2000 | Fujita et al. | |
| 6,278,439 B1 | 8/2001 | Rosenberg et al. | |
| 6,317,116 B1 | 11/2001 | Rosenberg et al. | |
| 6,429,846 B2 | 8/2002 | Rosenberg et al. | |
| 6,809,462 B2 | 10/2004 | Pelrine et al. | |
| 7,051,292 B2 | 5/2006 | Nagase | |
| 7,131,073 B2 | 10/2006 | Rosenberg et al. | |
| 7,196,688 B2 | 3/2007 | Schena | |
| 7,202,837 B2 | 4/2007 | Ihara | |
| 7,339,572 B2 | 3/2008 | Schena | |

(Continued)

FOREIGN PATENT DOCUMENTS

| | | |
|---|---|---|
| EP | 2 026 178 A1 | 2/2009 |
| JP | 09-319509 A | 12/1997 |

(Continued)

OTHER PUBLICATIONS

Extended European search report dated Oct. 7, 2010 issued by the European Patent Office in counterpart European Application No. 10166013.2.

(Continued)

*Primary Examiner* — Quan-Zhen Wang
*Assistant Examiner* — Chad Dicke
(74) *Attorney, Agent, or Firm* — Sughrue Mion, PLLC

(57) ABSTRACT

A user input device and electronic apparatus are provided. The user input device includes a first substrate on which first electrodes are formed; a second substrate disposed to be spaced apart from the first substrate, and on which second electrodes are formed; an electro-rheological fluid contained in a gap between the first substrate and the second substrate; and one or more lighting keypad units disposed on the second substrate. Each of the lighting keypad unit includes one or more key symbols which are different from one another. The electronic apparatus includes one or more user input devices.

20 Claims, 13 Drawing Sheets

(56) References Cited

U.S. PATENT DOCUMENTS

| | | |
|---|---|---|
| 7,342,573 B2 | 3/2008 | Ryynaenen |
| 7,436,396 B2 | 10/2008 | Akieda et al. |
| 7,477,242 B2 | 1/2009 | Cross et al. |
| 7,511,706 B2 | 3/2009 | Schena |
| 7,589,714 B2 | 9/2009 | Funaki |
| 7,608,976 B1 | 10/2009 | Cheng et al. |
| 7,679,611 B2 | 3/2010 | Schena |
| 7,688,080 B2 | 3/2010 | Golovchenko et al. |
| 7,719,167 B2 | 5/2010 | Kwon et al. |
| 2001/0026636 A1 | 10/2001 | Mainguet |
| 2001/0035854 A1 | 11/2001 | Rosenberg et al. |
| 2002/0033795 A1 | 3/2002 | Shahoian et al. |
| 2002/0039620 A1 | 4/2002 | Shahinpoor et al. |
| 2002/0101410 A1 | 8/2002 | Sakata et al. |
| 2005/0057528 A1 | 3/2005 | Kleen |
| 2005/0076824 A1 | 4/2005 | Cross et al. |
| 2005/0130604 A1 | 6/2005 | Chipchase et al. |
| 2005/0200286 A1 | 9/2005 | Stoschek et al. |
| 2005/0285846 A1 | 12/2005 | Funaki |
| 2006/0097991 A1 | 5/2006 | Hotelling et al. |
| 2006/0099808 A1 | 5/2006 | Kondo |
| 2006/0103634 A1 | 5/2006 | Kim et al. |
| 2006/0119589 A1 | 6/2006 | Rosenberg et al. |
| 2007/0080951 A1 | 4/2007 | Maruyama et al. |
| 2007/0152974 A1 | 7/2007 | Kim et al. |
| 2007/0152982 A1 | 7/2007 | Kim et al. |
| 2007/0182718 A1* | 8/2007 | Schoener et al. ............. 345/173 |
| 2007/0211032 A1 | 9/2007 | Ahn et al. |
| 2007/0229464 A1* | 10/2007 | Hotelling et al. ............ 345/173 |
| 2008/0024459 A1 | 1/2008 | Poupyrev et al. |
| 2008/0024461 A1 | 1/2008 | Richter et al. |
| 2008/0036746 A1 | 2/2008 | Klinghult |
| 2008/0100590 A1 | 5/2008 | Hur et al. |
| 2008/0111788 A1 | 5/2008 | Rosenberg et al. |
| 2008/0143689 A1 | 6/2008 | Foo et al. |
| 2008/0158169 A1 | 7/2008 | O'Connor et al. |
| 2008/0165134 A1 | 7/2008 | Krah |
| 2008/0165158 A1 | 7/2008 | Hotelling et al. |
| 2008/0284277 A1 | 11/2008 | Kwon et al. |
| 2009/0002199 A1 | 1/2009 | Lainonen et al. |
| 2009/0002328 A1 | 1/2009 | Ullrich et al. |
| 2009/0046065 A1* | 2/2009 | Liu et al. ...................... 345/168 |
| 2009/0046068 A1 | 2/2009 | Griffin |
| 2009/0075694 A1 | 3/2009 | Kim et al. |
| 2009/0085878 A1 | 4/2009 | Heubel et al. |
| 2009/0182501 A1 | 7/2009 | Fyke et al. |
| 2009/0231305 A1 | 9/2009 | Hotelling et al. |
| 2009/0308737 A1 | 12/2009 | Kudoh |
| 2010/0024573 A1 | 2/2010 | Daverman et al. |
| 2010/0026655 A1 | 2/2010 | Harley |
| 2010/0149108 A1 | 6/2010 | Hotelling et al. |
| 2010/0156829 A1 | 6/2010 | Shimodaira |
| 2010/0259485 A1* | 10/2010 | Chuang ........................ 345/173 |
| 2010/0321330 A1 | 12/2010 | Lim et al. |
| 2010/0321335 A1 | 12/2010 | Lim et al. |
| 2011/0057899 A1 | 3/2011 | Sleeman et al. |
| 2011/0163978 A1 | 7/2011 | Park et al. |
| 2011/0181530 A1 | 7/2011 | Park et al. |
| 2011/0227862 A1 | 9/2011 | Lim |
| 2012/0019467 A1 | 1/2012 | Hotelling et al. |
| 2012/0038563 A1 | 2/2012 | Park et al. |
| 2012/0086651 A1 | 4/2012 | Kwon et al. |
| 2012/0127122 A1 | 5/2012 | Lim |
| 2012/0262410 A1 | 10/2012 | Lim |

FOREIGN PATENT DOCUMENTS

| | | |
|---|---|---|
| JP | 2000-066782 A | 3/2000 |
| JP | 2001-282433 A | 10/2001 |
| JP | 2002-342035 A | 11/2002 |
| JP | 2004-71765 A | 3/2004 |
| JP | 2005-107804 A | 4/2005 |
| JP | 2005-275632 A | 10/2005 |
| JP | 2006-011646 A | 1/2006 |
| JP | 2006-146611 A | 6/2006 |
| JP | 2008-33739 A | 2/2008 |
| JP | 2008-257748 A | 10/2008 |
| JP | 2010-016969 A | 1/2010 |
| JP | 2010-079882 A | 4/2010 |
| JP | 2010-108505 A | 5/2010 |
| KR | 91-14838 A | 8/1991 |
| KR | 10-2001-0054523 A | 7/2001 |
| KR | 10-2004-0058731 A | 7/2004 |
| KR | 10-2005-0029285 A | 3/2005 |
| KR | 10-2006-0053769 A | 5/2006 |
| KR | 10-2006-0075135 A | 7/2006 |
| KR | 10-2006-0118640 A | 11/2006 |
| KR | 10-2006-0125544 A | 12/2006 |
| KR | 10-2007-0011524 A | 1/2007 |
| KR | 10-2007-0070897 A | 7/2007 |
| KR | 10-2007-0093251 A | 9/2007 |
| KR | 10-2008-0061047 A | 7/2008 |
| KR | 10-2008-0100757 A | 11/2008 |
| KR | 10-0877067 B1 | 1/2009 |
| KR | 10-2009-0011367 A | 2/2009 |
| KR | 10-2009-0029520 A | 3/2009 |
| KR | 10-0901381 B1 | 6/2009 |
| KR | 10-2009-0087351 A | 8/2009 |
| KR | 10-2009-0101292 A | 9/2009 |
| KR | 10-2009-0126760 A | 12/2009 |
| KR | 10-2010-0011368 A | 2/2010 |
| KR | 10-2010-0020065 A | 2/2010 |
| KR | 10-2010-0136759 A | 12/2010 |
| WO | 03/050754 A1 | 6/2003 |
| WO | 2004/014115 A1 | 2/2004 |
| WO | 2004/053909 A1 | 6/2004 |
| WO | 2005/091257 A1 | 9/2005 |
| WO | 2008/037275 A1 | 4/2008 |
| WO | 2009/002605 A1 | 12/2008 |

OTHER PUBLICATIONS

US Advisory Action, dated Apr. 26, 2013, issued in U.S. Appl. No. 12/849,310.
Final US Office Action, dated Dec. 20, 2012, issued in U.S. Appl. No. 12/849,310.
Non-Final US Office Action, dated Aug. 28, 2012, issued in U.S. Appl. No. 12/849,310.
Final US Office Action, dated Mar. 27, 2013, issued in U.S. Appl. No. 12/948,479.
Non-Final US Office Action, dated Oct. 15, 2012, issued in U.S. Appl. No. 12/948,479.
Non-Final US Office Action, dated Apr. 22, 2013, issued in U.S. Appl. No. 13/050,550.
Non-Final US Election Requirement, dated Apr. 10, 2013, issued in U.S. Appl. No. 13/097,937.
European Communication, dated Mar. 19, 2013, issued in European Application No. 11150285.2.
Non-Final US Office Action, dated May 7, 2013, issued in U.S. Appl. No. 12/719,281.
Non-Final US Office Action, dated Mar. 15, 2013, issued in U.S. Appl. No. 12/889,800.

* cited by examiner

USER INPUT DEVICE AND ELECTRONIC APPARATUS INCLUDING THE SAME

CROSS REFERENCE TO RELATED APPLICATION

This application claims priority under 35 U.S.C. §119(a) from Korean Patent Application No. 10-2010-0044031, filed on May 11, 2010, the entire disclosure of which is incorporated by reference herein for all purposes.

BACKGROUND

1. Field

Devices and apparatuses consistent with the present disclosure relate to user interfaces, and more particularly, to a user input device and an electronic apparatus including the same.

2. Description of the Related Art

Electronic devices, in particular, mobile electronic devices, are continuously being miniaturized, and digital convergence is also under way with the development of digital technology. It is advantageous for an electronic apparatus in which several modules are combined to provide a user with a user input interface according to the type and/or execution stage of an executed application. When user input interfaces are implemented using a mechanical input device (e.g., a key button), it is advantageous for the mechanical input device employed in the electronic apparatus to be reduced in size, or that one key button serve as an input button for various purposes. However, there are disadvantages in that the reduction in size of the mechanical input device or the provision of various uses of one key button are limited by the miniaturization trend of electronic apparatuses, and also increase the probability of malfunction due to mis-input, for example, by hitting an incorrect one of the miniaturized keys.

To address these disadvantages of the mechanical input device, a user input device having a touch panel has been proposed. For example, a touch panel has been employed in a touch pad used in place of a mouse in a laptop computer, netbook, etc. Another example is a touch screen combined with the display of an electronic apparatus in one body, and so on. Among these examples, the touch screen is a device having a touch panel installed on the screen of a display such as a liquid crystal display (LCD). An electronic apparatus having a touch screen displays different input key symbols on a screen according to the type and/or execution stage of an executed application, thereby providing various input interfaces.

To constitute the screen of a display, a touch panel prepared in the touch screen may be installed with the display in one body, or additionally attached to the screen of the display. In any case, the touch screen is used in combination with the display. Thus, there is a disadvantage in that the touch screen cannot be employed as an input device for an electronic apparatus having no display, or in place of a mechanical input device prepared at a position other than a screen (e.g., function or number buttons of a cellular phone, or buttons installed on a side surface of a small electronic apparatus).

Touch panels can be classified into a resistive type, a capacitive type, a surface acoustic wave (SAW) type, an infrared type, etc. according to a method of detecting an input. For example, a capacitive-type touch panel detects a change in capacitance caused by a contact or pressure at a specific point, thereby determining whether or not there is an input at the corresponding point. However, there is a disadvantage in that a user input device (not limited to a touch screen) having such a touch panel cannot give a feeling of input, that is, an input feeling or haptic feeling, to a user. To address this disadvantage, it has been proposed to install a vibration motor under a touch panel. In this way, when an input is detected, the whole touch panel is vibrated by the vibration motor, thereby providing a user with the input feeling or haptic feeling.

SUMMARY

The following description relates to a user input device which provides a click sensation similar to that of a mechanical key button, and whose input key symbols dynamically vary in position, shape, composition, etc. according to a stage of a running application or application, and an electronic apparatus including the user input device.

The following description also relates to a user input device which can be used in situations in which a display is not installed to provide various input feelings including a click sensation, and an electronic apparatus including the user input device.

According to an aspect of an embodiment, there is provided a user input device of an electronic apparatus, including: a first substrate on which a plurality of first electrodes are formed; a second substrate disposed to be spaced apart from the first substrate, and on which a plurality of second electrodes are formed; an electro-rheological (ER) fluid contained in a gap between the first substrate and the second substrate; and a plurality of lighting keypad units disposed on the second substrate, each lighting keypad unit comprising at least one key symbol, wherein the at least one key symbol of one of the lighting keypad units is different than the at least one key symbol of another of the lighting keypad units.

One of the lighting keypad units may be operated according to a type of a running application of the electronic apparatus or a stage of the running application.

According to an aspect of another embodiment, there is provided a user input device of an electronic apparatus, including: an input device body, a plurality of lighting keypad units, and a control unit. The input device body comprises a first substrate; a second substrate; an electro-rheological (ER) fluid contained in a gap between the first substrate and the second substrate, and an array of driving electrode pairs formed on the first substrate and the second substrate, an electric field being locally induced in the gap when a driving voltage is applied across the driving electrode pairs. The plurality of lighting keypad units is disposed on the second substrate, each of the plurality of lighting keypad units comprising at least one key symbol, the at least one key symbol of one of the lighting keypad units being different than the at least one key symbol of another of the lighting keypad units. The control unit operates one of the plurality of lighting keypad units according to a type of a running application of the user input device or a stage of the running application.

Other features will become apparent to those skilled in the art from the following detailed description, which, taken in conjunction with the attached drawings, discloses exemplary embodiments of the invention.

DETAILED DESCRIPTION

Figure 1:
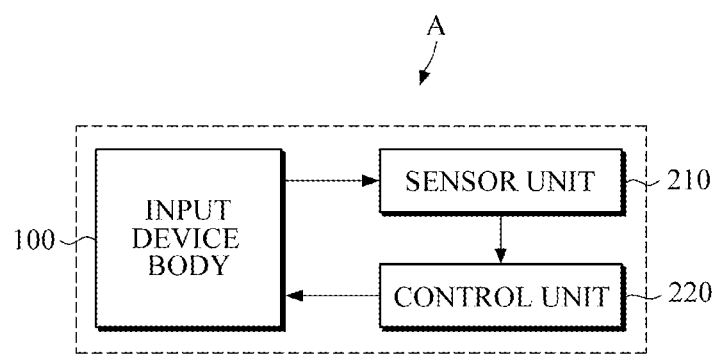
FIG. 1 is a block diagram of an user input device according to an embodiment.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

A user input device described below may be employed in place of the whole or a part of a mechanical keypad in any type of electronic apparatus having a mechanical keypad. Also, the user input device may be employed in place of various input key symbols displayed on a touch screen or in place of various combinations of input key symbols in any type of electronic apparatus having a touch screen. For example, the user input device can be used in place of a number pad, a side key and/or a click wheel of a mobile apparatus, and/or the user input device can be used in place of various input key symbols displayed on a touch screen regardless of whether a keypad or touch screen is provided. Also, the user input device may be used as a touch pad provided in a laptop computer, etc., which will be described later.

The types of electronic apparatuses in which the user input device can be employed are not limited. For example, the user input device may be employed in portable electronic apparatuses such as a mobile phone, a personal digital assistant (PDA), a portable multimedia player (PMP), an electronic book (e-book) terminal, and a portable computer. The user input device may be provided on one or more surfaces of a portable electronic apparatus including an upper surface, a lower surface, and also a side surface. In other words, the user input device is not limited to being provided at a location on the device where a display is provided. Further, the user input device may be employed in fixed electronic apparatuses such as an automated teller machine (ATM), an information retrieval apparatus, and an automated ticket machine.

The user input device can provide different input key symbols or input key symbol combinations according to a type or stage of an executed application. Also, the user input device can provide a user with various input feelings or click sensations. Such an input feeling or click sensation may vary according to a selection made by the user and/or the type or stage of an application. For example, the user can have different input feelings or click sensations due to a difference in force applied to a contact point which is an input position, that is, a difference a reaction force of the user input device. To realize such a difference in reaction force, an electro-rheological (ER) fluid is contained in a gap between upper and lower substrates, and a position or area to/from which a driving voltage is applied/cut off or the magnitude of a displacement of the gap between the upper and lower substrates at a point in time that the driving voltage is cut off is adjusted.

FIG. 1 is a block diagram of an exemplary user input device A.

Referring to FIG. 1, the user input device A includes an input device body 100, a sensor unit 210, and a control unit 220. The input device body 100 indicates a physical structure constituting the user input device A. On the other hand, the sensor unit 210 and the control unit 220 may be an electrical circuit and/or hardware/software detecting an input to the input device body 100 and controlling operation of the input device body. The sensor unit 210 and the control unit 220 are logically distinguished from each other according to their functions, and may be combined with each other or separately implemented. Also, the logical separation of functions of the sensor unit 210 and the control unit 220 is for convenience of description, and thus one combined component may perform all functions of the sensor unit 210 and the control unit 220, or some functions performed by one component (e.g., the sensor unit 210) may be performed by the other component (e.g., the control unit 220) unless contrary to the nature of the other component. The structure and operation of the input device body 100 will be described below.

Figure 2:
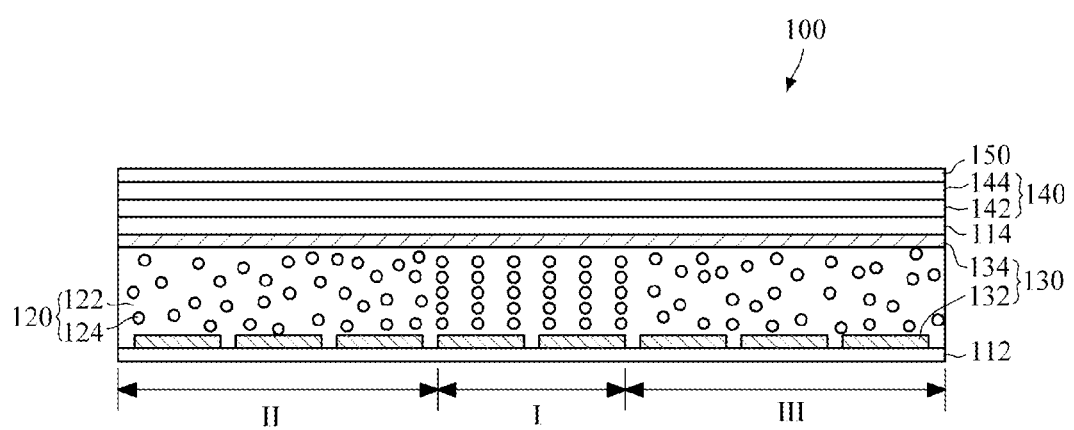
FIG. 2 illustrates an example of an input device body of the user input device shown in FIG. 1.

FIG. 2 illustrates an example of the constitution of the input device body 100 shown in FIG. 1. Referring to FIG. 2, the input device body 100 includes one pair of substrates, that is, a lower substrate 112 and an upper substrate 114, an ER fluid 120 contained and sealed in a gap between the lower substrate 112 and the upper substrate 114, an array of driving electrode pairs 130 formed on the lower substrate 112 and the upper substrate 114, one or more lighting layers 140, and a keypad 150. FIG. 2 schematically shows the constitution and layered structure of the input device body 100, in which the actual size, thickness, etc. of each component may be different from those shown in the drawing.

The lower substrate 112 is a base substrate of the input device body 100, and functions as one side of a container for containing and sealing the ER fluid 120 in the input device body 100. Although not shown in the drawing, the lower substrate 112 may be attached to a printed circuit board (PCB) of an electronic apparatus. It is advantageous that the lower substrate 112 not be deformed even if a force of attraction or repulsion acts between the upper substrate 112 and the lower substrate 114. To this end, the lower substrate 112 may be formed of a hard material, but is not limited to the hard material only. The force may be predetermined. For example, when the lower substrate 112 is attached to a PCB, the lower substrate 112 may be formed of a flexible material such as a polymer film. The lower substrate 112 may be formed of a non-transparent material.

When a predetermined force is applied from the upside (e.g., when a user pushes down on the keypad 150 in FIG. 2), the upper substrate 114 may be deformed. For example, when a user presses down on the keypad 150 using a finger, a stylus, etc., the upper substrate 114 may be deformed together with the keypad 150 and the lighting layers 140. To this end, the upper substrate 114 may be formed of a deformable polymer film, etc. The type of the polymer is not limited, and the upper substrate 114 may also be formed of a transparent material. However, neither the upper substrate 114 or the lower substrate is required to be formed of a transparent substrate.

Since the upper substrate 114 is disposed to be spaced apart from the lower substrate 112 by a distance, a gap is formed between the upper substrate 114 and the lower substrate 112 to have a size. The distance and the gap may be predetermined. The size of the gap may vary according to the level of a driving voltage applied to the driving electrode pairs 130, the area of the input device body 100, the cross-sectional area of the driving electrode pairs 130, etc. For example, the gap between the upper and lower substrates 114 and 112 may be about 50 to 500 µm.

The gap between the lower substrate 112 and the upper substrate 114 is filled with the ER fluid 120. The ER fluid 120 may be sealed off from the outside, and to this end, a sealant (not shown) may be disposed between the upper substrate 114 and the lower substrate 112. The ER fluid 120 may be a suspension whose minute particles 124 are dispersed in an electrically insulating fluid 122. When an electric field is formed in the gap between the upper substrate 114 and the lower substrate 112, the viscosity of the ER fluid 120 increases by about several hundred to about one hundred thousand times. Such a change in viscosity of the ER fluid 120 is reversible, and thus can be restored to the original state when the electric field disappears.

The ER fluid 120 is a transparent or non-transparent liquid. The electrically insulating fluid 122 may be, for example, silicon oil, kerosene mineral oil, and polychlorinated biphenyl, but is not limited to these materials. The particles 124 included in the ER fluid 120 have a maximum size of about 50 µm and are very minute and transparent. As the particles 124, for example, a polymer such as aluminosilicate, polyaniline, or polypyrrole, or fullerene may be used.

In the gap between the upper substrate 114 and the lower substrate 112, spacers (not shown) may be disposed. The spacers are small solids which have a size of tens of micrometers or less and elasticity. The spacers may be randomly or regularly dispersed and disposed in the ER fluid 120. A material constituting the spacers is not limited, and the spacers may be formed of, for example, an elastomer. The spacers provide a force of restitution when the upper substrate is deformed, and also may structurally support the upper substrate 114. The spacers may be formed of a transparent material.

Figure 4A:
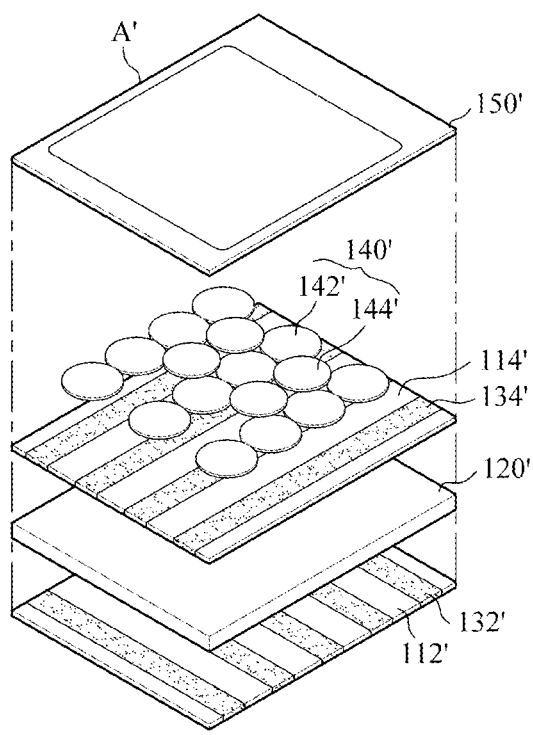
FIGS. 4A to 4C illustrate an example of a constitution and operation state of the input device body shown in FIG. 2.
Figure 4A:
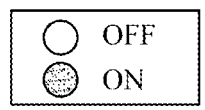

Each of the driving electrode pairs 130 comprises one of a plurality of lower electrodes 132 prepared on the lower substrate 112 and one of a plurality of upper electrodes 134 disposed at a position corresponding to the lower electrode 132 on the upper substrate 114 (see, e.g., FIG. 4A). The lower electrodes 132 and the upper electrodes 134 may be formed of a transparent material, and may be formed of a metal, such as copper, generally used for electrical interconnections.

The driving electrode pairs 130 may be arranged on the entire area or a partial area of the input device body 100 in a matrix form. To the driving electrode pairs 130 arranged in the matrix form (that is, the array of driving electrode pairs), a driving voltage may be applied according to a predetermined combination (e.g., to only a part of the driving electrode pairs 130). The user input device A may change the number of the driving electrode pairs 130 in the array of the driving electrode pairs to which the driving voltage is applied (e.g., the extent of the area to which the driving voltage is applied), the magnitude of the displacement of the upper substrate 114 at a point in time that the applied driving voltage is cut off, the number of the driving electrode pairs 130 from which the applied driving voltage is cut off, etc., thereby providing a user with various input feelings or click sensations. This will be described in more detail later.

The array of driving electrode pairs shown in FIG. 2 is an example of the driving electrode pairs 130 arranged in a matrix form. Referring to FIG. 2, the plurality of line-type electrode patterns 132 and line-type electrode patterns 134 (see also, e.g., FIG. 4A) are formed side by side on the upper surface of the lower substrate 112 and the lower surface of the upper substrate 114, respectively. Here, the electrode patterns formed on the lower substrate 112, that is, the lower electrode patterns 132, extend in a first direction perpendicular to the cut-off direction of FIG. 2, and the electrode patterns formed on the upper substrate 114, that is, the upper electrode patterns 134, extend in a second direction perpendicular to the first direction (i.e., the cut-off direction of FIG. 2). Thus, at the crossings between the lower electrode patterns 132 and the upper electrode patterns 134, the driving electrode pairs 130 arranged in the matrix form are defined on the entire area or a partial area of the input device body 100.

Unlike those shown in FIG. 2, alternatively dot-type lower electrodes and dot-type upper electrodes may be disposed on the upper substrate 114 and the lower substrate 112 to constitute the driving electrode pairs 130. Here, the upper and lower electrodes facing each other may be disposed in a matrix form on the entire surface or a partial area of the upper substrate 114 and the lower substrate 112. Each of the lower and upper electrodes may have a polygonal shape, such as a quadrangle, or a circular shape. The dot-type driving electrode pairs may be connected with switchable active devices, respectively. Using these active devices, the dot-type driving electrode pairs may be separately switched in response to a control signal of the control unit 220.

The driving voltage applied to the driving electrode pairs 130 provides a driving force for locally changing the viscosity of the ER fluid 120. The driving voltage may be supplied from the power supply of an electronic apparatus in which the user input device A is installed. The sensor unit 210 and/or the control unit 220 may control the number of the driving electrode pairs 130 to which the driving voltage is applied, the magnitude of the displacement of the upper substrate 114 at a point in time that the applied driving voltage is cut off, the number of the driving electrode pairs 130 from which the applied driving voltage is cut off, and so on.

FIG. 2 shows a case in which the driving voltage is not applied to the driving electrode pairs 130 disposed in area II and area III, but is applied to the driving electrode pairs 130 disposed in area I. To this end, while an electric potential Vd of a predetermined magnitude is applied to the upper electrode patterns 134, the lower electrode patterns 132 disposed in area I may be connected to the ground, and the lower electrode patterns 132 disposed in area II and area III may be placed in a floating state. Needless to say, it will be appreciated by those of ordinary skill in the art that electric potentials applied to the upper electrode patterns 134 and the lower electrode patterns 132 may be changed with each other.

As shown in area I of FIG. 2, when the driving voltage is applied to some of the driving electrode pairs 130 (e.g., an electric potential is applied to the upper electrodes 134 and the lower electrodes 132 are connected to the ground), an electric field is locally induced in a portion of the gap corresponding to the positions of the driving electrode pairs 130 between the upper substrate 114 and the lower substrate 112. The viscosity of the ER fluid 120 present in area I increases due to the induced electric field. This is because the particles 124 having a polarization characteristic stand in columns as shown in FIG. 2. On the other hand, when the driving voltage is not applied to some of the driving electrode pairs 130 (e.g., an electric potential is applied to the upper electrodes 134 but the lower electrodes 132 are placed in a floating state), an electric field is not induced in the portion of the gap corresponding to the positions of the driving electrode pairs 130 between the upper substrate 114 and the lower substrate 112, and the viscosity of the ER fluid 120 present in area II and area III does not vary.

An example of a touch panel making use of such a change in viscosity of ER fluid is described in detail in U.S. patent application Ser. No. 12/780,996 "Touch Panel and Electronic Apparatus Including the Same" filed by the present applicant on May 17, 2010, which is incorporated here in by reference. U.S. patent application Ser. No. 12/780,996 discloses a touch panel which defines a predetermined input button area in a contact surface using a change in viscosity of an ER fluid and provides the same click sensation as obtained by manipulating a mechanical keypad.

A click sensation indicates a feeling of clicking obtained when a mechanical keypad, key button, etc. is pressed. The mechanical keypad, key button, etc., may be employed in a cellular phone, etc. In a mechanical keypad, a dome-shaped thin metal plate referred to as a metal dome (or, sometimes referred to as a "popple") is installed under a key button. When a force of a predetermined magnitude or more is continuously applied to the metal dome, the dome shape of the metal dome is suddenly deformed at a point in time referred to as a buckling point. Due to the buckling point of the metal dome, a user receives a feeling of clicking when the mechanical keypad is pressed. Here, the feeling of clicking is referred to as a click sensation.

Figure 3:
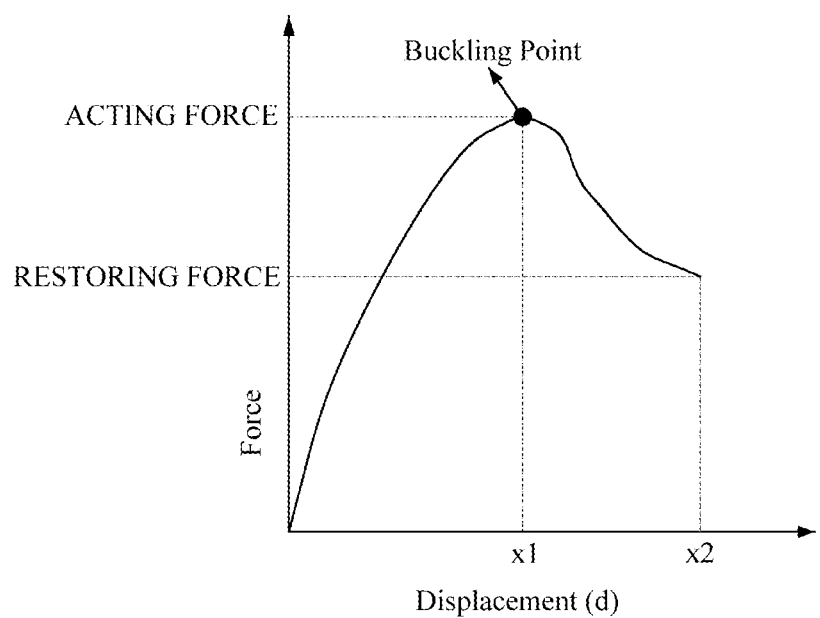
FIG. 3 is a graph showing a relationship between force and displacement of a mechanical keypad having a metal dome.

FIG. 3 is a graph showing the relationship between force and displacement of a mechanical keypad having such a metal dome. Referring to FIG. 3, the displacement of the metal dome gradually increases due to a pressing force at the initial stage. When the displacement of the metal dome increases, the supporting force (a resistance force against deformation) of the metal dome also increases, and a reaction force increases as much as the supporting force. It is this reaction force that is felt by the user. When the displacement of the metal dome arrives at $x_1$, the supporting force of the metal dome becomes the maximum (an acting force) and then suddenly decreases. The point at which the supporting force of the metal dome becomes the maximum (i.e., a point at which an acting force acts in a touch panel) is the buckling point. When the pressing force is maintained after the displacement of the metal dome arrives at the buckling point, the displacement keeps increasing. When the displacement arrives at $x_2$, the metal dome comes in contact with a lower electrode. When the pressing force is removed after the displacement arrives at the buckling point, the metal dome is restored to the original state by a restoring force.

The user input device A simulates such a mechanism to provide a click sensation. As mentioned above, when the driving voltage is applied to the driving electrode pairs 130, the ER fluid 120 present in an area of the user input device A having the driving electrode pairs 130 (area I) has a considerably higher viscosity than before. Area I in which the viscosity is increased (referred to as a "viscosity increasing area") provides a greater reaction force against the pressing force than other areas, e.g., area II and area III. As the pressing force increases and/or the displacement of the upper substrate 114 caused by the pressing force increases, the reaction force also increases. When the pressing force becomes a predetermined level or more and/or the displacement arrives at a predetermined magnitude or more, the applied driving voltage is cut off. When the driving voltage is cut off, the viscosity of the ER fluid 120 suddenly decreases, and thus the reaction force against the pressing force also suddenly decreases. For this reason, a click sensation is obtained at the buckling point from the user input device A at a point in time that the driving voltage is cut off.

The click sensation from a mechanical keypad (or the user input device A simulating a mechanical keypad) is determined by an acting force and restoring force (or a click rate (CR)). The acting force indicates a supporting force of the metal dome or a resistance force applied from the metal dome, that is, the maximum reaction force, when the displacement arrives at the buckling point. The restoring force indicates a force of restitution restoring the deformed metal dome to the original state after the buckling point. The CR may be defined by a function of the acting force and the restoring force as shown in Equation 1. Referring to Equation 1, the CR is obtained by dividing a difference between the acting force and the restoring force by the acting force.

$$CR=(\text{Acting force}-\text{Restoring Force})/\text{Acting Force} \qquad \text{[Equation 1]}$$

When the acting force and/or the restoring force is appropriately controlled on the basis of Equation 1, the user input device A simulating operation of a mechanical keypad can provide various click sensations. An example of a user input device which provides various click sensations by controlling the acting force and/or the restoring force is described in detail in U.S. application Ser. No. 12/849,310, "Touch Panel and Electronic Apparatus Including the Same" filed by the present applicant on Aug. 3, 2010, which is incorporated herein by reference.

One method of varying the acting force in the user input device A is to change the magnitude of the maximum reaction force. The greater the displacement of the upper substrate 114, the greater a reaction force. Thus, when the magnitude of the displacement of the upper substrate 114 at the point in time that the driving voltage is cut off is changed, the magnitude of the maximum reaction force can be changed.

Another method of varying the acting force in the user input device A is to change the number of the driving electrode pairs 130 to which the driving voltage is applied. When the number of driving electrode pairs to which the driving voltage is applied increases, the acting force of the user input device A increases. On the other hand, when the number of driving electrode pairs to which the driving voltage is applied decreases, the acting force of the user input device A decreases.

This method makes use of the fact that the viscosity of the ER fluid 120 present in the gap between the driving electrode pairs 130 to which the driving voltage is applied locally increases. This is because the ER fluid 120 having the increased viscosity provides a relatively greater reaction force against the pressing force. Since the reaction force may increase in proportion to the area of the ER fluid 120 having the increased viscosity, the acting force of the user input device A may also increase with an increase in the number of driving electrode pairs 130 to which the driving voltage is applied.

Furthermore, the ER fluid 120 having the increased viscosity hinders the neighboring ER fluid 120 from flowing. Thus, when the driving voltage is applied to driving electrode pairs disposed in an area adjacent to an input button area as well as the input button area, the resistance force of the user input device A may increase. However, the reaction force and/or the resistance force of the user input device A may vary according to whether the area in which viscosity is increased is the entire input button area or includes the adjacent area, or according to whether the area in which the viscosity is increased is spaced apart from the input button area by a predetermined distance, and so on.

The input device body 100 including the upper substrate 114 and the lower substrate 112, the ER fluid 120, and the array of the driving electrode pairs 130 may be used as a user input device in which an input is made by a pressing action, such as a mechanical input button, and also as a user input device in which an input is made by a slide action, such as a click wheel. During the slide action, the input device body 100 may provide various input feelings or contact feelings.

Referring back to FIG. 2, the plurality of lighting layers 140 function as a backlight which emits light toward the keypad 150 and are disposed on the upper substrate 114. The keypad 150 is provided on the lighting layers 140, and different key symbols and/or key symbol combinations are formed in the keypad 150 so as not to overlap each other. The composition of the lighting layers 140 and the keypad 150 provided on the lighting layers 140 is an example of a plurality of lighting keypad units respectively having different key symbols or key symbol combinations.

Although not shown in the drawing, an insulating layer formed of a transparent material may be interposed between the lighting layers 140 and/or between an uppermost lighting layer 144 and the keypad 150. The insulating layer prevents heat, which is generated from the lighting layers 140 or from electrical energy applied to the lighting layers 140, etc., from influencing another layer. Also, a transparent protection film may be additionally disposed on the keypad 150. The protection film serves to seal off the user input device A from moisture or protect the user input device A from an external impact such as a scratch.

The lighting layers 140 may include a plurality of physically different layers 142 and 144 having different light sources. The lighting layers 140 may or may not overlap each other in the vertical direction. Each of the lighting layers 142 and 144 may be disposed in a shape so as to emit light to only a part of the entire area of the keypad 150. For example, an area to which the first lighting layer 142 emits light may correspond to one key symbol or key symbol combination of the keypad 150, and an area to which the second lighting layer 144 emits light may correspond to another key symbol or key symbol combination of the keypad 150, so that the two areas do not overlap each other. To this end, the lighting layers 140 may be implemented by one or more electroluminescent sheets (see FIGS. 4A to 4C) whose lighting areas do not overlap each other, or a plurality of optical waveguide films whose optical paths do not overlap each other. In this case, one electroluminescent sheet and one key symbol or key symbol combination, or one optical waveguide film and one key symbol or key symbol combination disposed at positions corresponding to each other may be considered to constitute one lighting keypad unit.

Alternatively, the lighting layers 140 may physically include only one lighting layer, but the lighting layer may have a plurality of light sources having different colors (in this specification, a single layer physically consisting of one layer but emitting light of different colors is also considered a plurality of lighting layers). One of the light sources may be selectively turned on, or the light sources may be simultaneously turned on/off. When the light sources are simultaneously turned on, a combined color may be shown. In the keypad 150, different key symbols and/or key symbol combinations are formed so as not to overlap each other. Each key symbol and/or key symbol combination may be selectively displayed according to the color of the lighting layer (see FIGS. 5A to 5C). In this case, the lighting layer emitting light of one color and one key symbol or a key symbol combination displayed by the color constitute one lighting keypad unit.

Figure 4B:
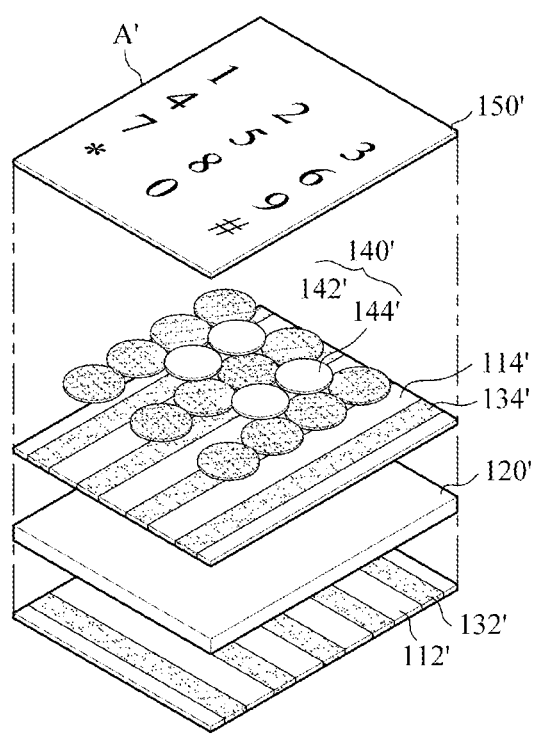
Figure 4B:
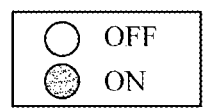
Figure 4C:
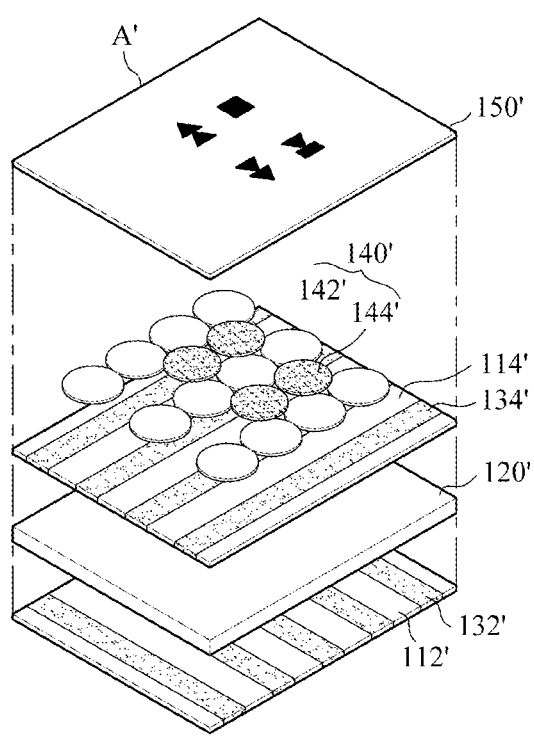
Figure 4C:

FIGS. 4a to 4C are disassembled perspective views showing an example of the constitution and operation of a user input device A' including a plurality of electroluminescent sheets. In FIGS. 4A to 4C, a plurality of electroluminescent layers 140' include a first electroluminescent sheet 142' in which relatively large circular lighting devices are arranged in a four by three array, and a second electroluminescent sheet 144' in which relatively small circular lighting devices are arranged in a two by two array. But this arrangement is merely an example. The lighting areas of the first electroluminescent sheet 142' and the second electroluminescent sheet 144' (i.e., the positions of lighting devices) do not overlap each other and correspond, respectively, to the positions of a first key symbol combination (number key symbols of a phone, etc.) and a second key symbol combination (operation control key symbols of a multimedia player) formed in a keypad 150' (see, e.g., FIGS. 4B and 4C, respectively). The colors of light emitted from the respective electroluminescent sheets 142' and 144' need not be identical. Non-described reference numerals 112', 114', 120', 132' and 134' are the same as those of FIG. 2, and the description thereof will not be reiterated.

Referring to FIGS. 4A to 4C, the user input device A' may be used as a number pad of a touch pad, phone, etc. and an operation control panel of a multimedia player. To be specific, when power is supplied to neither of the first electroluminescent sheet 142' and the second electroluminescent sheet 144' as shown in FIG. 4A, no key symbol is displayed on the surface of the user input device A', so that the user input device A' can be used as a touch pad of an electronic apparatus (e.g., a cellular phone). When power is supplied only to the first electroluminescent sheet 142' as shown in FIG. 4B, a number key symbol combination for inputting a number is displayed on the surface of the user input device A', so that the user input device A' can be used as a number pad of a cellular phone. Further, when power is supplied only to the second electroluminescent sheet 144' as shown in FIG. 4C, a key symbol combination for controlling replay of multimedia content, etc. is displayed on the surface of the user input device A', so that the user input device A' can be used as a replay control panel of a cellular phone used as a multimedia player.

Figure 5A:
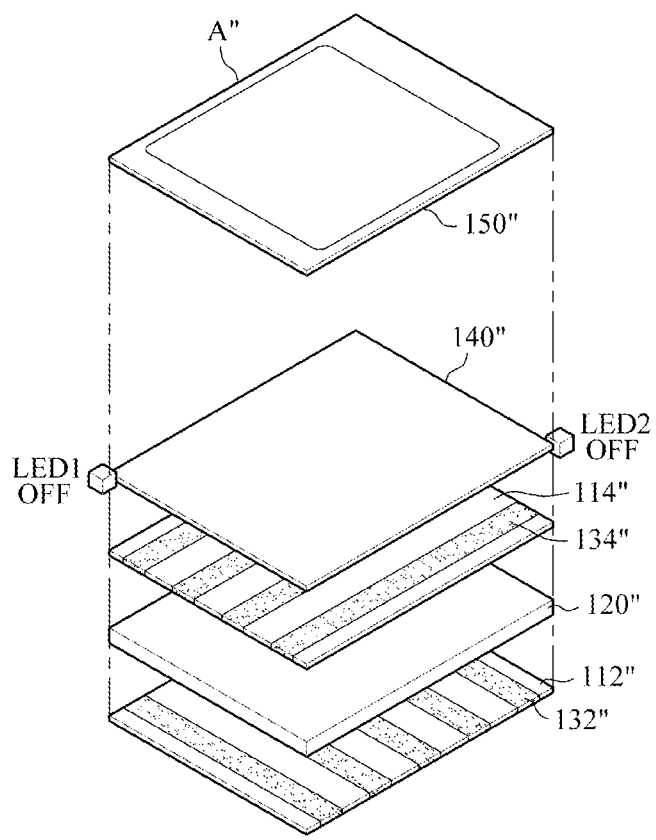
FIGS. 5A to 5C illustrate another example of a constitution and operation state of the input device body shown in FIG. 2.
Figure 5B:
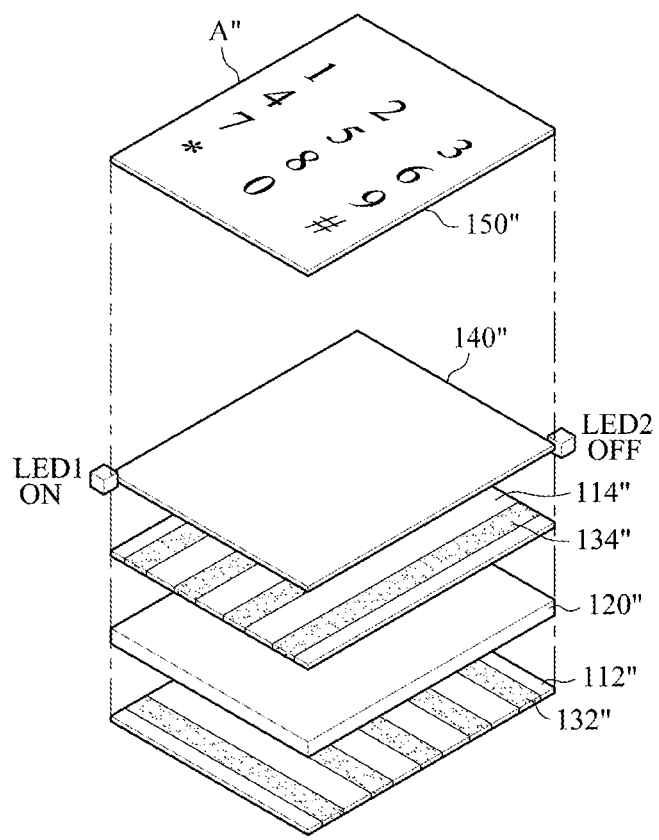
Figure 5C:
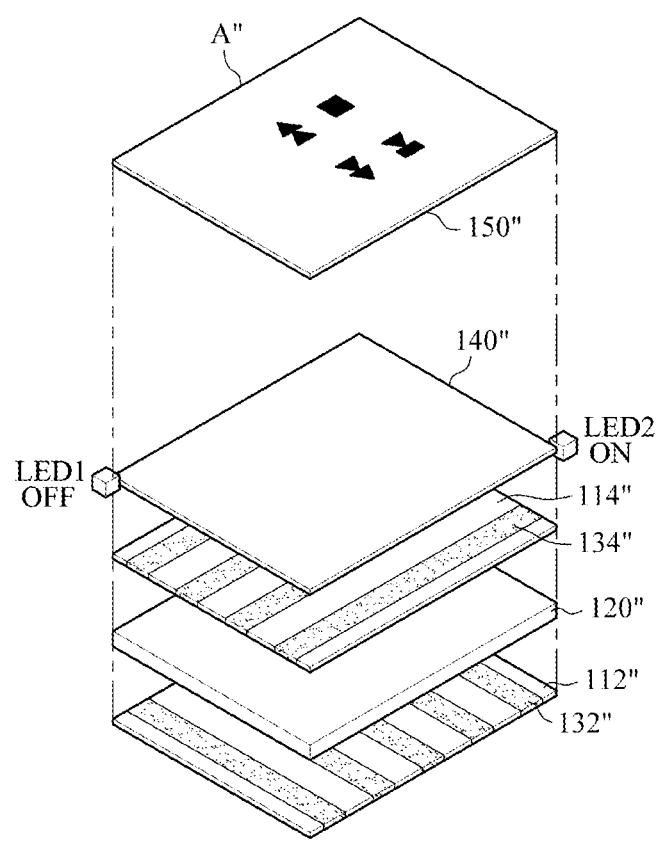

FIGS. 5A to 5C are disassembled perspective views showing an example of the constitution and operation of a user input device A" including a lighting layer emitting light of a plurality of colors. In FIGS. 5A to 5C, the plurality of lighting layers 140 shown in FIG. 2 include one thin film waveguide 140", and a first light source LED1 and a second light source LED2 which are optically connected to the thin film waveguide 140" and emit light of different colors. When the first light source LED1 or the second light source LED2 is turned on, the whole thin film waveguide 140" emits light of the same color. In a keypad 150" provided on the thin film waveguide 140", a first key symbol combination (number key symbols of a phone, etc.) and a second key symbol combination (operation control key symbols of a multimedia player) are formed. The first and second key symbol combinations are displayed when one of the light sources is turned on, and maintained transparent when the other of the light sources is turned on. Non-described reference numerals 112", 114", 120", 132" and 134" are the same as those of FIG. 2, and the description thereof will not be reiterated.

Referring to FIGS. 5A to 5C, the user input device A" may also be used as a number pad of a touch pad, phone, etc. and an operation control panel of a multimedia player. To be specific, when power is supplied to neither of the first and second light sources LED1 and LED2 as shown in FIG. 5A, no key symbol is displayed on the surface of the user input device A", so that the user input device A" can be used as a touch pad of an electronic apparatus (e.g., a cellular phone). When power is supplied only to the first light source LED1 as shown in FIG. 5B, a number key symbol combination for inputting a number is displayed on the surface of the user input device A", so that the user input device A" can be used as a number pad of a cellular phone. When power is supplied only to the second light source LED2 as shown in FIG. 5C, a key symbol combination for controlling replay of multimedia content, etc. is displayed on the surface of the user input device A", so that the user input device A" can be used as a replay control panel of a cellular phone used as a multimedia player.

In this way, one of a plurality of lighting keypad units operates according to the type of a running application in an electronic apparatus having the user input device A' or the user input device A". Also, an operating lighting keypad may vary according to the stage of a running application. As a result, the user input device A' or the user input device A" can display and provide user input key buttons to execute the application. Such a selection of a lighting keypad unit may be controlled by the control unit 220 (see FIG. 1), which will be described later.

Figure 6:
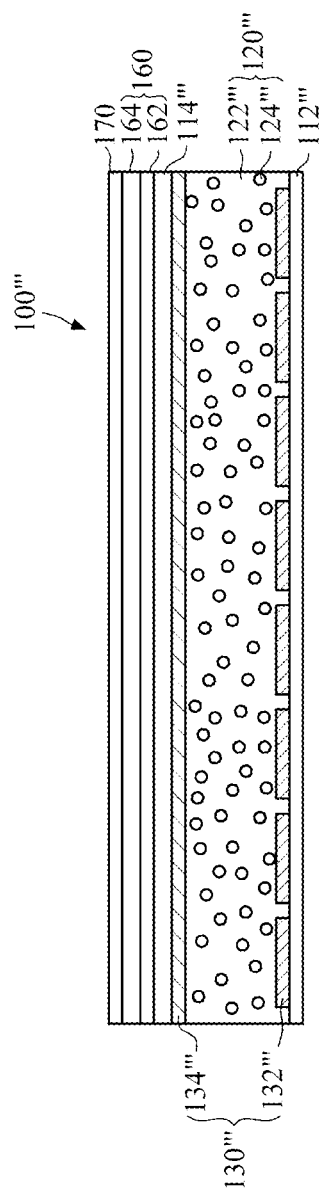
FIG. 6 illustrates another example of an input device body of the user input device shown in FIG. 1.

FIG. 6 illustrates another example of a constitution of the input device body 100 shown in FIG. 1. Like FIG. 2, FIG. 6 schematically shows the constitution and layered structure of an input device body 100', in which the actual size, thickness, etc. of each component may be different from those shown in the drawing.

Referring to FIG. 6, the input device body 100''' includes one pair of substrates, that is, a lower substrate 112''' and an upper substrate 114''', an ER fluid 120''' contained and sealed in a gap between the lower substrate 112''' and the upper substrate 114''', an array of driving electrode pairs 130''' formed on the lower substrate 112''' and the upper substrate 114''', a plurality of integrated lighting keypads 160, and a cover film 170. The composition and operation of the lower substrate 112''' and the upper substrate 114''', the ER fluid 120''', and the array of the driving electrode pairs 130''' are the same as described for the input device body 100 of FIG. 2, and the description thereof will not be reiterated.

The integrated lighting keypads 160 are stacked on the upper substrate 114'''. The integrated lighting keypads 160 are all-in-one keypads in which a backlight and a keypad are integrated in one sheet. The input device body 100''' includes two or more of the integrated lighting keypads 160 having different key symbols or key symbol combinations. Thus, the integrated lighting keypads 160 are different examples of a plurality of lighting keypad units respectively having different key symbols or key symbol combinations.

The colors of backlights prepared in the respective integrated lighting keypads 162 and 164 need not be white, and need not be the same. The different key symbols or key symbol combinations formed in the respective integrated lighting keypads 162 and 164 may overlap each other, but need not do so. When the integrated lighting keypads 162 and 164 are not supplied with power (i.e., light sources of the backlights are not turned on) and do not operate, both of the integrated lighting keypads 162 and 164 become transparent, or at least the upper integrated lighting keypad 164 becomes transparent. Thus, when only one of integrated lighting keypads operates, the input device body 100''' displays a key symbol or key symbol combination formed in the corresponding lighting keypad.

The cover film 170 may be additionally disposed on the integrated lighting keypads 160. The cover film 170 serves to seal off the user input device A from moisture and/or protect the integrated lighting keypads 160 from an external impact such as a scratch. Although not shown in the drawing, an insulating layer formed of a transparent material may be interposed between the integrated lighting keypads 160 and/or between the uppermost lighting keypad 164 and the cover film 170. The insulating layer prevents heat, which is generated from the integrated lighting keypads 160, or from electrical energy applied to the integrated lighting keypads 160, etc., from influencing another layer.

Figure 7A:
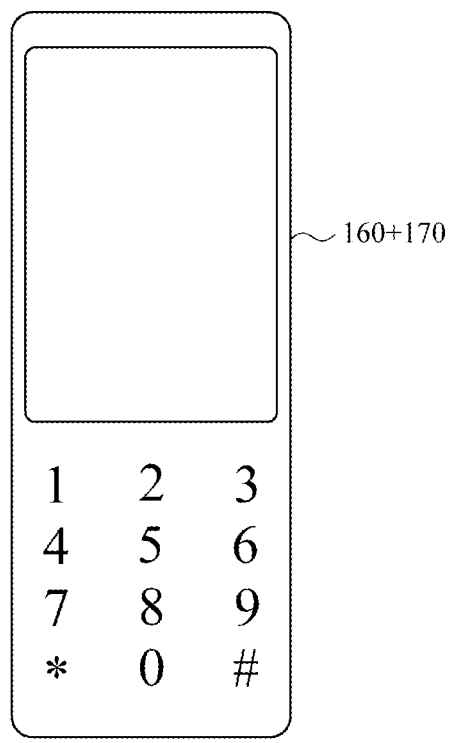
FIGS. 7A to 7C illustrate an example of a constitution and operation state of the input device body shown in FIG. 6.
Figure 7B:
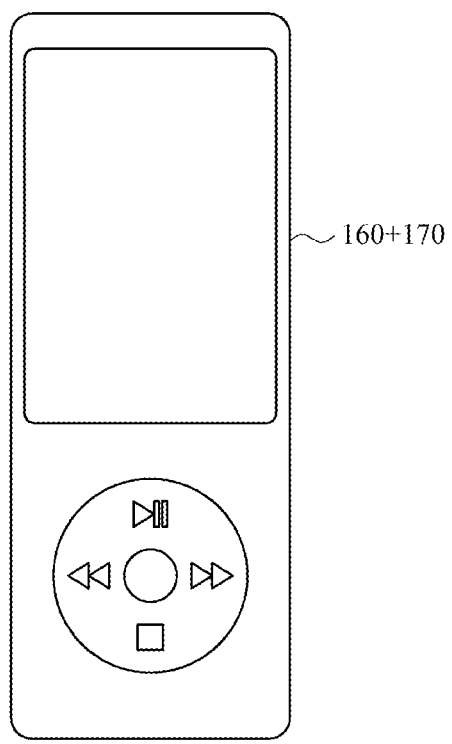
Figure 7C:
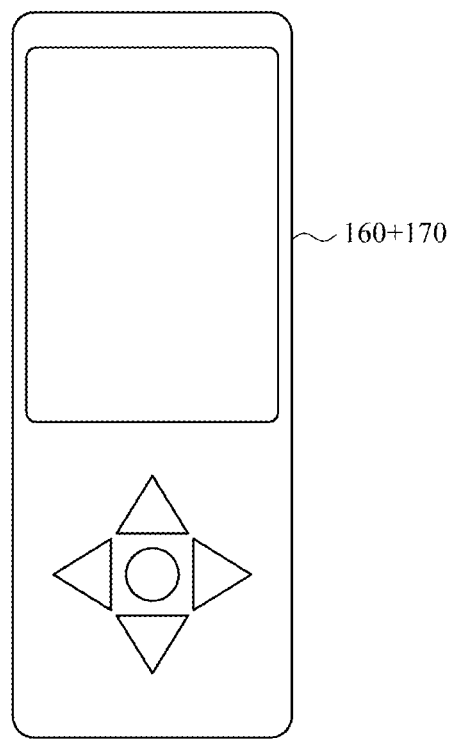

FIGS. 7A to 7C show examples of a user input interface of an electronic apparatus including the input device body 100''' of FIG. 6. In FIGS. 7A to 7C, an empty space shown as a rectangle may be a display screen of the electronic apparatus. The electronic apparatus shown in FIGS. 7A to 7C has a user input device including at least three integrated lighting keypads, and key symbols or key symbol combinations formed in the respective integrated lighting keypads may overlap each other. Referring to FIGS. 7A to 7C, a number symbol combination is formed in one of the integrated lighting keypads (FIG. 7A), a symbol combination for controlling replay of multimedia content is formed in another of the integrated lighting keypads (FIG. 7B), and a symbol combination for indicating a direction is formed in the other of the integrated lighting keypads (FIG. 7C).

The user input device A of FIG. 1 including the input device body 100 or 100''' of FIG. 2 or FIG. 6 can display a user input interface according to the type of an application and/or the stage of a running application, which can be controlled by the control unit 220 of the user input device A shown in FIG. 1. For example, when a selection of an application to be run is input on an electronic apparatus, the control unit 220 may operate one of a plurality of lighting keypad units to display a key symbol or key symbol combination used to run the selected application. When a direction is selected in an electronic apparatus (e.g., a horizontal direction or vertical direction in a rectangular electronic apparatus), the control unit 220 may operate a lighting keypad unit appropriate for the selected direction.

The sensor unit 210 and/or the control unit 220 of the user input device A shown in FIG. 1 can enable the user input device A including the input device body 100 or 100''' of FIG. 2 or FIG. 6 to provide various input feelings as well as a click sensation similar to that of a mechanical input button, and also to display an input key symbol or input key symbol combination according to the type of a running application and/or a stage of the running application. This will be described in further detail below with reference to FIG. 1.

The sensor unit 210 determines whether there is an input to the input device body 100, and also calculates an input location when it is determined that there is an input. The information about whether or not there is an input determined by the sensor unit 210 and information about the input location may be transferred to the control unit 220. A method for the sensor unit 210 to determine whether or not there is an input is not limited. For example, when there is an input (contact or pressure) on the upper surface of the input device body 100, the upper substrate 114 is deformed at the corresponding position, and a displacement is generated. In this case, the sensor unit 210 may measure a change in capacitance caused by such a deformation of the upper substrate 114 (e.g., a change in capacitance caused by a change in the size of the gap between the upper substrate 114 and the lower substrate 112), thereby determining whether or not there is an input. Here, when a reference value for determining whether or not there is an input (the magnitude of the capacitance between the upper substrate 114 and the lower substrate 112) is changed, the magnitude of the displacement of the upper substrate 114 based on which the sensor unit 210 determines that there is an input may also be changed. Thus, the user input device A can adjust a displacement at which the applied driving voltage is cut off by changing the reference value based on which the sensor unit 210 determines whether or not there is an input. In this way, the user input device A can provide various click sensations.

The control unit 220 may control an appropriate user input interface to be displayed according to the type of an application running on an electronic apparatus having the user input device A and/or a stage of the running application. In other words, when the user input device A has a plurality of lighting keypad units, the control unit 220 may operate one of the lighting keypad units according to the type of an application and/or a stage of the running application, so that an input key symbol or input key symbol combination used to execute the application can be displayed.

The control unit 220 can adjust the number and/or positions of driving electrode pairs to which the driving voltage is applied. The number or positions of driving electrode pairs to which the driving voltage is applied may be adjusted according to a lighting keypad unit (more specifically, an input button area formed in the lighting keypad unit) operated by the control unit 220. For example, when number buttons are formed in an operating lighting keypad unit, the driving voltage may be applied only to driving electrode pairs present at positions at which numbers are displayed.

To provide various input feelings and click sensations and define one input button, the control unit 220 may change the number and/or positions of driving electrode pairs to which the driving voltage is applied. For example, to provide a stronger acting force (reaction force), the control unit 220 may apply the driving voltage to driving electrode pairs disposed in an area in which the input button is present and also an area adjacent to the input button area (in this case, it will be appreciated by those of ordinary skill in the art that a part of the adjacent area may overlap the input button or the adjacent area may not overlap the input button at all). On the other hand, to provide a weaker acting force (reaction force), the control unit 220 may apply the driving voltage only to driving electrode pairs disposed in the area in which the input button is present and not to driving electrode pairs disposed in the adjacent area. Here, it will be appreciated by those of ordinary skill in the art that when the number of driving electrode pairs to which the driving voltage is applied among the driving electrode pairs disposed in the adjacent area is changed by stages, or the positions of the driving electrode pairs to which the driving voltage is applied (e.g., a distance from the input button area, etc.) are changed, the reaction force can be changed by stages.

The control unit 220 may adjust the number and/or positions of driving electrode pairs from which the driving voltage is cut off after the sensor unit 210 performs input check (or after an input check signal is received from the sensor unit 210). To be specific, the control unit 220 may change the number and/or positions of driving electrode pairs from which the driving voltage is cut off after the buckling point. For example, to provide a stronger restoring force, the control unit 220 may cut off the driving voltage from driving electrode pairs among driving electrode pairs to which the driving voltage is applied or bring the driving electrode pairs into the floating state. On the other hand, to provide a weaker restoring force, the control unit 220 may cut off most or all of the driving electrode pairs to which the driving voltage is applied. In this case, it will be appreciated by those of ordinary skill in the art that when the number of driving electrode pairs from which the driving voltage is cut off is changed by stages, the restoring force can be changed by stages.

In this way, the reference value based on which the sensor unit 210 determines whether or not there is an input (e.g., the magnitude of a displacement at which it is determined that there is an input and the magnitude of a reaction force according to the magnitude of a displacement) or the number or positions of driving electrode pairs to or from which the control unit 220 applies or cuts off the driving voltage may be determined in advance or changed according to the type of an application or a stage of the application. In the latter case, the determination reference of the sensor unit 210 or the operation reference of the control unit 220 may be adjusted according to a program installed in advance, or intentionally changed by a user. For example, when important information such as a password is input, or when an important application related to banking is executed, the sensor unit 210 and/or the control unit 220 may be set to give a stronger click sensation or change a click sensation according to a stage of the application. On the other hand, when entertainment such as a game is being enjoyed, the sensor unit 210 and/or the control unit 220 may be set to minimize a click sensation or provide a uniform click sensation regardless of a stage of an application.

An exemplary user input device can provide input keys having a predetermined size or more as well as various user input interfaces appropriate for types of applications running on a small electronic apparatus, thus preventing mis-input which may result from small input keys. In particular, an exemplary user input device can provide a click sensation similar to that of a mechanical key button while replacing a mechanical input device. Also, an exemplary user input device can dynamically change the positions, shapes, composition, etc. of input key symbols according to the stage of a running application or application.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user input device of an electronic apparatus, the user input device comprising:
   a first substrate on which a plurality of first electrodes are formed;
   a second substrate that is spaced apart from the first substrate, and on which a plurality of second electrodes are formed,
   wherein an array of driving electrode pairs is defined by the first electrodes and the second electrodes;
   an electro-rheological fluid contained in a gap between the first substrate and the second substrate;
   a plurality of lighting keypad units disposed on the second substrate, each lighting keypad unit of the plurality of lighting keypad units comprising at least one key symbol,
   wherein the at least one key symbol of one of the plurality of lighting keypad units is different than the at least one key symbol of another one of the plurality of lighting keypad units, and
   a control unit which cuts off a driving voltage which is applied to at least a first portion of the driving electrode pairs to drive the electro-rheological fluid from at least a second portion of the driving electrode pairs when the second substrate has a predetermined magnitude of displacement in response to a pressure applied thereto.

2. The user input device of claim 1, wherein one of the plurality of lighting keypad units is operated according to a type of a running application of the user input device, or a stage of the running application.

3. The user input device of claim 1, wherein the control unit adjusts at least one of a number of the driving electrode pairs among the array of driving electrode pairs to which the driving voltage is applied, and positions of the driving electrode pairs among the array of driving electrode pairs to which the driving voltage is applied.

4. The user input device of claim 3, wherein the control unit adjusts at least one of a number of driving electrode pairs from which the driving voltage is cut off among the driving electrode pairs to which the driving voltage is applied, positions of driving electrode pairs from which the driving voltage is cut off among the driving electrode pairs to which the driving voltage is applied, and a magnitude of the displacement of the second substrate at which the applied driving voltage is cut off.

5. The user input device of claim 4, wherein the number of the driving electrode pairs or the positions of the driving electrode pairs to or from which the driving voltage is applied or cut off are adjusted according to a type of an operating lighting keypad unit.

6. The user input device of claim 1, wherein each the plurality of lighting keypad units comprises:
a keypad comprising the at least one key symbol; and
a plurality of lighting layers disposed under the keypad,
wherein the plurality of lighting keypad units are formed such that the at least one key symbol of respective keypads do not overlap each other, and
the respective lighting layers emit light in positions corresponding to positions of the at least one key symbol in the keypad.

7. The user input device of claim 6, wherein each of the plurality of lighting layers comprises:
an electroluminescent sheet, or
one or more light sources and an optical waveguide film that is optically connected to the one or more light sources so that light emitted from one or more light sources passes through the optical waveguide film.

8. The user input device of claim 1, wherein the plurality of lighting keypad units comprise a plurality of integrated lighting keypad sheets, and each of the plurality of integrated lighting keypad sheets comprises the at least one key symbol.

9. The user input device of claim 8, wherein the at least one key symbol of one of the plurality of integrated lighting keypad sheets at least partially overlap the at least one key symbol of another of the plurality of integrated lighting keypad sheets.

10. A user input device of an electronic apparatus, the user input device comprising:
an input device body comprising:
a first substrate;
a second substrate;
an electro-rheological (ER) fluid contained in a gap between the first substrate and the second substrate, and
an array of driving electrode pairs which is formed on the first substrate and the second substrate, and is configured to induce an electric field being locally in the gap when a driving voltage is applied across the driving electrode pairs;
a plurality of lighting keypad units disposed on the second substrate, each of the plurality of lighting keypad units comprising at least one key symbol, the at least one key symbol of one of the plurality of lighting keypad units being different than the at least one key symbol of another one of the plurality of lighting keypad units; and
a control unit which operates one of the plurality of lighting keypad units according to a type of a running application of the user input device or a stage of the running application, and controls to cut off the driving voltage from at least a portion of the driving electrode pairs when the second substrate has a predetermined magnitude of displacement in response to a pressure applied thereto.

11. The user input device of claim 10, wherein the control unit adjusts at least one of a number of the driving electrode pairs among the array of driving electrode pairs to which a driving voltage locally driving the ER fluid is applied, and positions of the driving electrode pairs among the array of driving electrode pairs to which a driving voltage locally driving the ER fluid is applied, or
the control unit adjusts at least one of a number of driving electrode pairs from which the driving voltage is cut off among the driving electrode pairs to which the driving voltage is applied, positions of driving electrode pairs from which the driving voltage is cut off among the driving electrode pairs to which the driving voltage is applied, and a magnitude of the displacement of the second substrate at which the applied driving voltage is cut off.

12. The user input device of claim 11, wherein the control unit adjusts the number of the driving electrode pairs or the positions of the driving electrode pairs to or from which the driving voltage is applied or cut off according to a type of the operating lighting keypad unit.

13. The user input device of claim 10, further comprising a sensor unit that determines whether an input to the lighting keypad unit occurs based on a change in a size of the gap between the first substrate and the second substrate.

14. The user input device of claim 13, wherein the sensing unit determines whether the input occurs by comparing the change in the size of the gap against a threshold gap size, and the threshold gap size is adjustable.

15. The user input device of claim 10, wherein each of the plurality of lighting keypad units comprises:
a keypad comprising the at least one key symbol of the lighting keypad unit; and
a plurality of lighting layers disposed under the keypad,
wherein the plurality of lighting keypad units are formed such that the at least one key symbol of respective keypads do not overlap each other, and
the respective lighting layers emit light in positions corresponding to positions of the at least one key symbol in the keypad.

16. The user input device of claim 15, wherein each of the plurality of lighting layers comprises:
an electroluminescent sheet, or
one or more light sources and an optical waveguide film that is optically connected to the one or more light sources so that light emitted from one or more light sources passes through the optical waveguide film.

17. The user input device of claim 10, wherein the plurality of lighting keypad units comprise a plurality of integrated lighting keypad sheets each of which comprises the at least one key symbol.

18. The user input device of claim 17, wherein integrated lighting keypad sheets of the plurality of integrated lighting keypad sheets that are not operated by the control unit are transparent, and
the at least one key symbol of one of the plurality of integrated lighting keypad sheets at least partially overlaps the at least one key symbol of another one of the plurality of integrated lighting keypad sheets.

19. An electronic apparatus comprising the user input device of claim 1.

20. The electronic apparatus of claim 19, further comprising a plurality of user input devices, wherein one of the plurality of user input devices is different from another one of the plurality of user input devices.

\* \* \* \* \*